United States Patent
Shah et al.

(10) Patent No.: US 6,418,117 B1
(45) Date of Patent: *Jul. 9, 2002

(54) OUT OF BAND MESSAGING IN A DRA NETWORK

(75) Inventors: Jasvantrai C. Shah, Richardson; Lee Dennis Bengston, Murphy; Clint Allen Wagner, Allen; Hal Badt, Richardson, all of TX (US)

(73) Assignee: MCI WorldCom, Inc., Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,589

(22) Filed: Sep. 8, 1998

(51) Int. Cl.$^7$ ................................ G01R 31/08
(52) U.S. Cl. .................. 370/225; 370/227; 370/244
(58) Field of Search .................. 370/224, 222–228, 370/250, 248, 241, 242, 215–218, 221, 358, 384; 379/221–223; 714/4; 703/23

(56) References Cited

U.S. PATENT DOCUMENTS

| | | |
|---|---|---|
| 4,648,088 A | 3/1987 | Cagle et al. |
| 4,825,206 A | 4/1989 | Brice, Jr. et al. |
| 4,853,927 A | 8/1989 | Wenzel |
| 4,884,263 A | 11/1989 | Suzuki |
| 4,956,835 A | 9/1990 | Grover |
| 5,070,497 A | 12/1991 | Kleine-Altekamp |
| 5,146,452 A | 9/1992 | Pekarske |
| 5,173,689 A | 12/1992 | Kusano |
| 5,189,662 A | 2/1993 | Kleine-Altekamp |
| 5,212,475 A | 5/1993 | Thoma |
| 5,218,601 A | 6/1993 | Chujo et al. |
| 5,233,600 A | 8/1993 | Pekarske |
| 5,235,599 A | 8/1993 | Nishimura et al. |
| 5,319,632 A | 6/1994 | Iwasaki |
| 5,325,366 A | 6/1994 | Shinbashi |
| 5,435,003 A | 7/1995 | Chng et al. |
| 5,455,832 A | 10/1995 | Bowmaster |
| 5,479,608 A | 12/1995 | Richardson |
| 5,493,273 A | 2/1996 | Smurlo et al. |
| 5,495,471 A | 2/1996 | Chow et al. |
| 5,537,532 A | 7/1996 | Chng et al. |
| 5,548,639 A | 8/1996 | Ogura et al. |
| 5,586,112 A | 12/1996 | Tabata |
| 5,590,118 A | 12/1996 | Nederlof |

(List continued on next page.)

FOREIGN PATENT DOCUMENTS

| | | |
|---|---|---|
| WO | 96/41440 | 12/1996 |
| WO | 97/48189 | 12/1997 |

OTHER PUBLICATIONS

Bouloutas et al. "Alarm Correlation and Fault Identification in Communication Networks"; 1994 IEEE Transactions and Communications.

Manione et al.; "An Inconsistencies Tolerant Approach in the Fault Design of Telecommunications Network"; Feb. 14, 1994.

*Primary Examiner*—Wellington Chin
*Assistant Examiner*—Prenell Jones

(57) ABSTRACT

To ensure the integrity of a telecommunications network provisioned with a distributed restoration algorithm (DRA), a communications network is provided for routing signaling messages such as DRA restoration and maintenance messages among the various nodes of the network. Thus, while data is sent among the nodes via the working links interconnecting the various nodes, signal messages are communicated among the various nodes by way of the independent communications network, which may be a wide area network. By reallocating the signal messages to a separate network, an efficient telecommunications network is effected.

11 Claims, 1 Drawing Sheet

U.S. PATENT DOCUMENTS

| | | | |
|---|---|---|---|
| 5,590,119 A | * 12/1996 | Moran et al. | 370/225 |
| 5,598,403 A | 1/1997 | Tatsuki | |
| 5,623,481 A | * 4/1997 | Russ et al. | 370/225 |
| 5,636,203 A | 6/1997 | Shah | |
| 5,636,206 A | 6/1997 | Amemiya et al. | |
| 5,646,936 A | 7/1997 | Shah et al. | |
| 5,657,320 A | 8/1997 | Russ et al. | |
| 5,680,326 A | 10/1997 | Russ et al. | |
| 5,710,777 A | 1/1998 | Gawne | |
| 5,721,727 A | 2/1998 | Ashi et al. | |
| 5,734,687 A | 3/1998 | Kainulainen | |
| 5,748,611 A | 5/1998 | Allen et al. | |
| 5,748,617 A | * 5/1998 | McLain, Jr. | 370/244 |
| 5,757,774 A | 5/1998 | Oka | |
| 5,781,535 A | 7/1998 | Russ et al. | |
| 5,802,144 A | 9/1998 | Laird et al. | |
| 5,812,524 A | 9/1998 | Moran et al. | |
| 5,832,196 A | 11/1998 | Croslin et al. | |
| 5,838,660 A | 11/1998 | Croslin | |
| 5,841,759 A | 11/1998 | Russ et al. | |
| 5,850,505 A | 12/1998 | Grover et al. | |
| 5,852,600 A | 12/1998 | Russ | |
| 5,862,125 A | 1/1999 | Russ | |
| 5,862,362 A | 1/1999 | Somasegar et al. | |
| 5,867,689 A | 2/1999 | McLain, Jr. | |
| 5,875,172 A | 2/1999 | Tabata | |
| 5,933,422 A | 8/1999 | Kusano et al. | |
| 5,943,314 A | 8/1999 | Croslin | |
| 5,991,338 A | 11/1999 | Trommel | |
| 5,999,286 A | 12/1999 | Venkatesan | |
| 6,021,113 A | 2/2000 | Doshi et al. | |
| 6,026,073 A | 2/2000 | Brown et al. | |
| 6,026,077 A | 2/2000 | Iwata | |
| 6,044,064 A | 3/2000 | Brimmage et al. | |
| 6,049,529 A | 4/2000 | Brimmage et al. | |
| 6,104,695 A | 8/2000 | Wesley et al. | |
| 6,108,309 A | 8/2000 | Cohoe et al. | |
| 6,137,775 A | 10/2000 | Barlett et al. | |
| 6,154,448 A | 11/2000 | Peterson et al. | |
| 6,167,025 A | 12/2000 | Hsing et al. | |

* cited by examiner

OUT OF BAND MESSAGING IN A DRA NETWORK

CROSS REFERENCE TO RELATED APPLICATIONS

The instant invention relates to the following applications having Ser. No. 08/825,440 filed Mar. 28, 1997, Ser. No. 08/825,441 filed Mar. 28, 1997, Ser. No. 09/046,089 filed Mar. 23, 1998, Ser. No. 08/483,579 filed Jun. 7, 1995, Ser. No. 08/736,800 filed Oct. 25,1996 and Ser. No. 08/781,495 filed Jan. 13,1997. The respective disclosures of those applications are incorporated by reference to the instant application.

The instant invention further relates to applications Ser. No. 09/148,944 filed on Sep. 8, 1998, Ser. No. 09/149,591 filed on Sep. 8, 1998, Ser. No. 09/148,942 filed on Sep. 8, 1998, Ser. No. 09/149,590 filed on Sep. 8, 1998, Ser. No. 09/149,177 filed on Sep. 8, 1998. The respective disclosures of the above applications are incorporated by reference herein.

FIELD OF THE INVENTION

This invention relates to a distributed restoration algorithm (DRA) network, and more particularly to the communication of messages among the DRA nodes of the network during the DRA process.

BACKGROUND OF THE INVENTION

In a telecommunications network provisioned with a distributed restoration algorithm (DRA), to restore traffic that has been disrupted due to a fault or malfunction at a given location thereof, messages required for the restoration process need to be sent to the various nodes of the network for locating alternate routes to reroute the disrupted traffic.

Prior to the instant invention, such communication of the restoration messages is effected on the spare channels, i.e. the spare links, that interconnect adjacent nodes. Such messages may include for example the flooding signature or restoration message sent by the sender node to the chooser node and the reverse restoration message sent by the chooser node to the sender node. Other messages that may be communicated among the various nodes include the keep alive messages disclosed in the aforenoted RIC-96-089 application, and messages such as path verification messages that maintain the integrity of the DRA network. In essence, the DRA messages are communicated in-band by way of the existing spare channels.

It has been found that the use of spare channels for transmitting in-band DRA messages is rather expensive. And as the network topology changes where new spares are introduced and old spares are removed or replaced, the transmitting of DRA messages through the spare channels becomes even more expensive and unwieldy.

There is therefore a need for a less expensive and yet more easily managed scheme for effecting communications among the various nodes of the DRA network.

SUMMARY OF THE PRESENT INVENTION

To provide a less expensive and easier scheme to manage the transmission of various messages among the DRA nodes of the network, the instant invention provisions a communications network separate from the DRA network so that communications may be done out of band of the DRA network. Such separate communications network may be in the form of a wide area network (WAN).

In particular, each of the nodes of the network is provisioned with a communications module that is communicatively connected to the WAN. The communications module in turn is in communication with the processor of the node so that a message can be directly conveyed from a first node to a second node of the network. Since the cost of a WAN is less than providing such communication through the spare links which interconnect the nodes, not only are the messages transmitted more quickly between the nodes, such transmission of messages via the WAN is also less costly.

The operation support system (OSS) of the network, in addition to being communicatively connected to each of the plurality of interconnected nodes of the network for monitoring the respective operations of the interconnected nodes, is also communicatively connected to the WAN so as to monitor the operation of the WAN. Thus, insofar as the integrity of the WAN (as monitored by the OSS) is sound, DRA messages can be broadcast from one node to all other nodes of the network by way of the WAN, in less time and more efficiently than was done before. Messages other than restoration messages may likewise be more efficiently distributed (and in less time) by way of the WAN.

An objective of the present invention is therefore to effect the sending of signaling message to the nodes of a DRA network without the need to utilize the spare channels that interconnect the nodes of the network.

Another objective of the present invention is the provision of an out of band signaling circuit that enables signal messages to be transmitted independent of the telecommunications network.

BRIEF DESCRIPTION OF THE FIGURE

The above-mentioned objectives and advantages of the present invention will become more apparent and the invention itself will be best understood with reference to the following description of an embodiment of the invention taken in conjunction with the accompanying drawing, which illustrates a DRA provisioned telecommunications network that has an out of band messaging circuit.

DETAILED DESCRIPTION OF THE INVENTION

Figure 1:
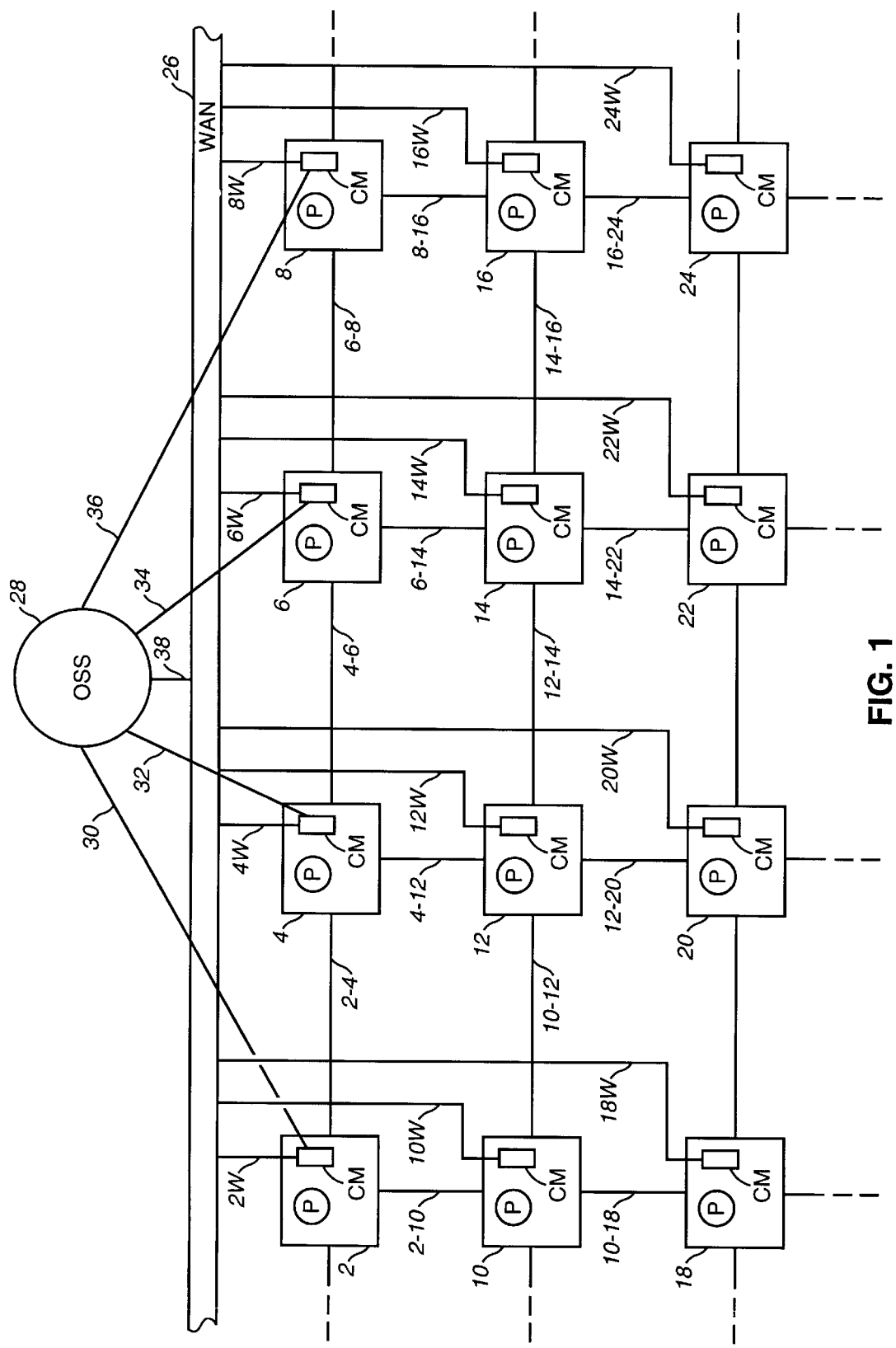

The exemplar DRA provisioned telecommunications network of the instant invention, as shown in the figure, comprises a number of nodes 2–24 each connected to its adjacent nodes by working and spare links represented for example as 2–4 between nodes 2 and 4, 4–6 between nodes 4 and 6, 6–8 between nodes 6 and 8, 2–10 between nodes 2 and 10, etc. Although shown as one line, in actuality, each of the lines interconnecting adjacent nodes should be construed to include both working and spare links. Although not shown in the figure, it should be appreciated that adjacent nodes are connected to each other by way of line terminating equipment (LTE).

As shown, each of the nodes includes its own processor P and a communications module CM, such as for example a conventional communications board used in a digital cross-connect switch such as for example the 1633-SX broadband cross-connect switch made by the Alcatel Network System company.

In addition to the telecommunication network that comprises the DRA provisioned nodes 2–24, there is further shown in the figure a conventional wide area network (WAN) 26 to which the respective communications modules of the nodes are connected. For example, the communications module CM of node 2 is communicatively connected to WAN 26 by way of a connection 2W. Likewise, CM4 is connected to WAN 26 per line 4W, CM6 to WAN 26 per 6W, CM8 to WAN 26 per 8W, etc. Signals or messages from each of the nodes shown in the figure could therefore be routed to other nodes of the exemplar telecommunications network by means of WAN 26, which is a network that is separate and distinct from the exemplar DRA provisioned telecommunications network. Note that even though WAN is described herein, other communication networks which utilize other modes of communications and/or data transport could also be utilized.

Also shown in the figure is a central controller, or an operation support system (OSS) 28, where the management of the network could monitor and possibly control the overall operation of the exemplar telecommunications network. The overall view, or map, of the layout and the operation of the respective nodes of the network is provided to OSS 28 by way of the respective communication connections that OSS 28 has with the respective nodes 2–24. For the sake of simplicity, only the connections which communicatively connect OSS 28 to node 2, 4, 6 and 8 are shown. As illustrated, nodes 2, 4, 6 and 8 are communicatively connected to OSS 28 by lines 30, 32, 34 and 36, respectively. As further shown, the connection from OSS 28 to the respective nodes is done by means of the communications module in each of those nodes. OSS 28 is further illustrated to be in communication with WAN 26 by means of a communication line 38.

In operation, the exemplar telecommunications network of the instant invention, in contrast to the prior art, sends its signaling messages, at least with respect to those messages that are DRA related, to its various nodes by way of WAN 26.

For example, suppose node 2 is the sender node and node 4 is the chooser node, with a malfunction having occurred at connection 2–4 between those nodes. Prior to the instant invention, sender node 2 would need to broadcast restoration messages to nodes downstream thereof for finding alternate paths to reroute the disrupted traffic to node 2. Such process may require that a restoration message be first sent to node 10, and from there to node 12, and then to node 14, and next to node 6, and finally to node 4.

The integrity of the system, which includes the integrity of WAN 26, is monitored continuously by OSS 28. As was mentioned earlier, WAN 26 can be used to route messages other than DRA messages among the various nodes of the network.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the present invention be limited only by the spirit and scope of the hereto appended claims.

What is claimed is:

1. A distributed restoration algorithm (DRA) provisioned telecommunications network, comprising:

a plurality of nodes interconnected by spare and working links;

a communications network independent of said DRA network; and a communications means in each of said nodes in communication with a processor means in said each node, said communications means further being communicatively connected to said communications network for communicating at least DRA messages with the others of said plurality of interconnected nodes when a failure occurs in said DRA network that disrupts traffic traversing between said interconnected nodes.

2. The DRA network of claim 1, wherein said communications network comprises a wide area network (WAN).

3. The DRA network of claim 1, further comprising:

a central operations system communicatively connected to each of said plurality of interconnected nodes for monitoring the operation of said plurality of interconnected nodes.

4. The DRA network of claim 2, further comprising:

a central operations system communicatively connected to each of said plurality of interconnected nodes for monitoring the operation of said plurality of interconnected nodes, said central operations system further being communicatively connected to said WAN for monitoring the operation of said WAN.

5. The DRA network of claim 1, wherein signals or messages other than DRA messages are communicated via said communications network.

6. In a telecommunications network provisioned with a distributed restoration algorithm (DRA) and having a plurality of interconnected nodes, a method of transmitting DRA messages, comprising the steps of:

establishing a communications network independent of said DRA network;

communicatively connecting said communications network to a communications means in each of said plurality of nodes; and communicating via the communications means in said each node at least DRA messages with the others of said plurality of interconnected nodes when a failure occurs in said DRA network that disrupts traffic traversing between said interconnected nodes.

7. The method of claim 6, wherein said communications network comprises a wide area network (WAN).

8. The method of claim 6, further comprising the step of:

communicatively connecting a central operations system to each of said plurality of interconnected nodes for monitoring the operation of said plurality of interconnected nodes.

9. The method of claim 7, further comprising the steps of:

communicatively connecting a central operations system to each of said plurality of interconnected nodes for monitoring the operation of said plurality of interconnected nodes; and communicatively connecting said central operations system also to said WAN for monitoring the operation of said WAN.

10. The method of claim 6, further comprising the step of:

communicating signals or messages other than DRA messages between said plurality of nodes via said communications network.

11. The method of claim 6, wherein the communications means in said each node is communicatively connected to a processor means in each of said plurality of interconnected nodes.

* * * * *